Patented Mar. 19, 1946

2,396,715

UNITED STATES PATENT OFFICE 2,396,715

PLASTICIZED POLYAMIDES

Frank C. McGrew, Wilmington, Del., assignor to E. I. du Pont de Nemours & Company, Wilmington, Del., a corporation of Delaware No Drawing. Application July 9, 1942, Serial No. 450,337

9 Claims. (Cl. 260—33)

This invention relates to new compositions of matter and more particularly to plasticized polyamides.

The polymeric materials with which this invention is concerned are the synthetic linear polyamides of the general type described in United States Patents 2,071,250, 2,071,253 and 2,130,948 which polymers can be obtained as high molecular weight products capable of being cold drawn with high permanent linear extension into oriented fibers. These polyamides, also referred to as nylons, are also useful for the manufacture of films and coatings.

The polyamides comprising the improved compositions described herein, generally speaking, comprise the reaction product of a linear polymer-forming composition containing amide-forming groups, for example, reacting material consisting essentially of bifunctional molecules, each containing two reactive groups which are complementary to reactive groups in other molecules and which include complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids and amino alcohols is intended to include the equivalent amide-forming derivatives of these reactants. The polyamides are best obtained from these reactants which have a unit length, as defined in the last two patents mentioned above, of at least 7.

The above described linear polyamides include also polymers obtained by admixture of other linear polymer-forming reactants, as for instance, glycol-dibasic acid mixtures or hydroxy acids in the case of polyester-amides, with the mentioned polyamide-forming reactants. Both the simple and modified linear polyamides contain the recurring amide group

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

Modification of the above described polyamides is desirable and necessary for some purposes and presents the problem of developing plasticized compositions which possess in addition to pliability other important properties required for the particular use to which the polyamide is put. For example, polyamide coated cloth used as upper material on footwear requires the use of a plasticized polyamide composition having properties not fuly realized heretofore, namely, an extremely high resistance to repeated flexing, not only at normal temperatures but also at low temperatures. The polyamide coated fabrics in general must also be free from exudation of the plasticizer over a wide temperature range, must show good outdoor durability, and high retention of pliability at low temperatures without becoming tacky at high temperatures. Although some of these properties have been obtained with plasticized polyamide compositions previously proposed, none of these compositions insofar as I am aware have contributed all the desired properties which are obtained by the polyamide compositions described herein. Although phenols in general are compatible with polyamides, most phenols have but limited utility due to their undesirable phenolic odor, corrosive properties, toxicity or poor color stability. The compositions previously obtained also do not have the exceptional pliability and flex durability, especially at low temperature, which are qualities of high importance and which characterize the new plasticized polyamide products described herein. Selected alkylene diphenols optionally combined with certain esters are an improvement over the prior phenols alone but again the products fall far short in meeting the objects of this invention.

This invention has as an object the preparation of new and improved polyamide compositions. A further object is a composition of this kind in which the above desired combination of properties is obtained by incorporation with the polyamide of a single component plasticizer. A further object is the production of improved films or coatings on flexible fabrics which exhibit a flex cracking resistance that is markedly superior to the similar products of the prior art. Other objects will appear hereinafter.

The above objects are accomplished by incorporating in the polyamide a monohydric alcohol ester of a long chain carboxylic acid which is substituted on the chain with an hydroxyphenyl group.

I have discovered that plasticized polyamide compositions having the desired properties can be produced by blending with a polyamide certain phenolated fatty acids esterified with a monohydric alcohol. In contrast to the simple alkylated phenols, the plasticizers of this invention are a select group of phenols alkylated with a hydrocarbon chain substituted with a single ester group. The remarkable properties conferred on the polyamides by the introduction of these plasticizers is attributed to this wholly new concept of the importance of modifying the action of the simple alkylated phenol by the presence of a single ester group, within the same molecule and at a specified position on the alkyl chain. Multiple ester groups, as shown in Example I, do not result in the improved properties peculiar to the phenolated esters used in the practice of this invention.

These compounds are illustrated by the structural formula:

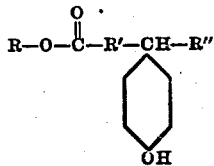

in which R is a monovalent aliphatic radical containing from 1 to 6 carbon atoms, R' is a divalent aliphatic radical, R" is a monovalent aliphatic radical, and in which the aliphatic chain

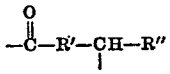

contains from 6 to 22 carbon atoms. These compounds can be referred to as phenolated long chain carboxylic acid esters, or as phenylol derivatives of long chain carboxylic acid esters. The most desirable plasticizers of this group are the monohydric alcohol esters of (9) 10-phenylolstearic acid of which the preferred member is the methyl ester represented by the formula

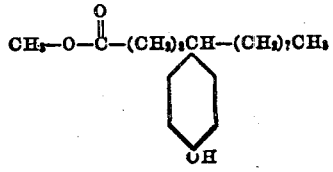

Although it is believed the phenol group is substituted on the 10 carbon of the chain, it may be on the 9 carbon atom. In view of this uncertainty the compound is referred to as (9) 10-phenylolstearate. Other plasticizers of this kind are the n-hexyl ester of (9) 10-phenylolstearic acid, the n-butyl ester of phenolated hydrosorbic acid, the n-propyl ester of phenolated Δ10 undecylenic acid, the ethyl ester of phenolated myristolenic acid, and the methyl ester of phenolated brassidic acid.

In preparing the plasticized compositions of this invention the plasticizing agent is usually used in quantities of from 5 to 65% of the combined weight of the polyamide and the plasticizing agent. Selection of the optimum proportions of these ingredients depends somewhat upon the polyamide employed and the physical properties desired in the final product as well as the presence or absence of other ingredients such as pigments or fillers. When the plasticized polyamide composition is to be used as a coating for fabrics the preferred quantity of plasticizer is from 10 to 60% of the weight of the polyamide-plasticizer composition.

A convenient method for incorporating the phenolic ester consists in dissolving it and the polyamide in a mutual solvent. Such solutions can be used in making coatings over fabric or in making filaments, films, rods, and the like by evaporative or coagulative methods. Lower fatty acids, e. g., formic acid, are useful solvents for this purpose. Methanol-calcium chloride systems are also conveniently used. Mixtures of chloroform and methanol, or ethanol and water, are especially useful solvents for the interpolyamides. These phenolic esters may also be incorporated in the polyamides by melt blending. Still another method consists in preparing the polyamides in the presence of the phenolic ester.

In the best method of carrying out the invention an alcohol-soluble polyamide is blended with the methyl, ethyl, propyl or butyl ester of (9) 10-monophenylolstearic acid. Suitable alcohol-soluble polyamides are those mentioned in the examples.

The invention is further illustrated by the following examples in which the parts are by weight and the melt viscosities referred to, unless otherwise stated, are obtained at 250° C.

*Example I*

An interpolyamide having a melt viscosity of 6400 poises, a melting point of about 175–177° C. and prepared from hexamethylenediammonium adipate and 6-aminocapronitrile in a 60:40 ratio is plasticized with purified ethyl (9) 10-phenylolstearate as follows: Ten parts of the interpolyamide and 5.4 parts of the plasticizer are dissolved in 55 parts of a solvent comprising equal volumes of chloroform and methanol. The solution is cooled to room temperature and poured onto a glass plate. By means of a levelling blade the solution is spread to an even layer and the solvent allowed to evaporate at room temperature. The composition melts at 175–177° C. when tested on a copper block in the open air. It has a tensile strength of 1885 lbs./sq. in. based on the original dimensions and elongates 216% of its original length prior to breaking in the tensile test. This pliable film has a dry surface, showing no exudation. When folded sharply it does not crack until cooled to +5° F.

The marked superiority of the present polyamide plasticizing compounds, even in the case of related materials previously regarded as excellent plasticizers, such as phenolated olive oil which is predominately the triglyceride of (9) 10-phenylolstearic acid, is shown by the fact that a film differing from that of the above example only by the use of 8.2 parts of the phenolated olive oil for 10 parts of interpolyamide cracked when folded sharply at +32° F.

*Example II*

The polyamide component in the plasticized composition of this example is an interpolyamide obtained by reacting hexamethylenediammonium adipate, hexamethylenediammonium sebacate, and caprolactam in a 40:30:30 ratio. This interpolyamide has a melt viscosity of 4000 poises and an intrinsic viscosity of 0.94. Ten parts of this interpolyamide and 10 parts of methyl (9) 10-phenylolstearate are dissolved in 55 parts of a solvent comprising equal volumes of chloroform and methanol. The solution is cooled to room temperature and spread to an even layer on a glass plate by means of a levelling blade. The solvent is allowed to evaporate at room temperature. The composition melts at substantially the same temperature as the original interpolyamide. It has a tensile strength of 1230 lbs./sq. in. based on the original dimensions and elongated 300% of its original length prior to breaking in the tensile test. When folded sharply this film did not crack until cooled to a temperature of —49° F. This extremely pliable film showed no exudation on cold drawing indicating excellent compatibility between the interpolyamide and the plasticizer.

*Example III*

The plasticized polyamide composition of this example consists of a mixture of methyl (9) 10-phenylolstearate and the interpolyamide obtained by reacting hexamethylenediammonium adipate, caprolactam, and hexamethylenediammonium sebacate in a 40:30:30 ratio. This interpolyamide has a melt viscosity of 9100 poises and melts at about 160° C. A composition A is obtained by heating 40 parts of the interpolyamide, 40 parts of the plasticizer, and 80 parts of ethanol to the boiling point until solution takes place. A composition B is prepared by dissolving 73.5 parts of the interpolyamide and 52.5 parts of the plasticizer in 150 parts ethanol and adding to this solution a dispersion of 3 parts carbon black in 21 parts of the plasticizer. An anchor coat is applied by spreading two coats of composition A over 1.32–53″ sateen fabric, each coat being followed by drying at approximately 60° C. At this point the coated fabric is passed through calender rolls with the hot roll at 150° C. in contact with the coating and the cold roll in contact with the fabric. This treatment smoothens the surface for subsequent coating. Using the same procedure of drying at 60° C. between coats, fifteen coats of composition B are applied bringing the coating weight to 9.5 oz./50″ yard. These coating compositions are applied hot in the region of 60–70° C. and are spread with a steam heated knife.

The coated fabric prepared in accordance with the above example withstands up to 61.5 million flexes on the Schiltknecht flex machine before the development of cracking failure. When this test is conducted at 0° F. the extreme durability of this material results in withstanding up to 7.8 million flexes before failure even under these severe conditions. After exposing the coated fabric for 4 weeks to a temperature of 65° C. additional evidence of its superior durability is shown by its ability to resist 14.6 million flexes before cracking failure. When subjected to a sharp bend no damage results to the coating until this operation is carried out at —40° F. In the scrub test described in Automotive Industries 49, 1262–6, this coated fabric is found to resist 28.7 thousand cycles before developing a break in the coating.

The improvement represented by the above test figures will be better understood by comparison of the same polyamide plasticized with a like amount of one of the best polyamide plasticizers heretofore developed, namely, a mixture of equal parts of 1,12-di(para-hydroxyphenyl)octadecane and butyl carbobutoxymethyl phthalate. Thus far the number of flexes mentioned above for the coated fabric of Example III is more than 14 times at room temperature and more than 92 times at 0° F. that of the same fabric similarly coated with the plasticizing mixture just mentioned.

*Example IV*

A coated fabric is prepared by applying at 60–70° C. to the anchor coated fabric of Example III 15 coats of a composition containing the plasticizer and polyamide in a 50:50 ratio and consisting of 40 parts of the same interpolyamide, 20 parts of methyl (9) 10-phenylolstearate as plasticizer, 40 parts of a dispersion of 20 parts bone black pigment in 20 parts of this plasticizer, and 100 parts of ethanol. To another section of the same anchor coated fabric is applied 17 coats of a composition containing the plasticizer and polyamide in a 60:40 ratio and consisting of 32 parts of the interpolyamide, 28 parts of methyl (9) 10-phenylolstearate, and 40 parts of a dispersion of 20 parts bone black pigment in 20 parts of the methyl (9) 10-phenylolstearate.

The higher plasticized composition in the above example yields still further advantages in the coated fabric with regard to flexibility, particularly at low temperature, and with regard to cracking and stiffness. For example, the number of flexes at room temperature is 54,500,000 and at 0° F. is 4,500,000 which is an increase of about 44% and 50% respectively over the number of flexes obtained with the fabric coated with the polyamide composition of lower plasticizer content. The cracking temperature on sharp bending is —31° F. in the case of the higher plasticized product and —26° F. in the case of the lower plasticized product, and the stiffness measured by the moment required to bend the sample through a 30° angle is 46 in the case of the higher plasticized product and 61 in the case of the lower plasticized product. These data show that the lower plasticized product is the stiffer of the two.

The advantage resulting from the fact shown by the above example that the present compositions can contain relatively large amounts of plasticizer when it is desired to develop the above properties to a high degree is of considerable importance since the plasticized compositions from which the most durable coated fabrics were obtained heretofore could not be used without undesirable exudation of the plasticizer.

*Example V*

The polyamide used in this example is an alcohol-soluble polyamide prepared by dissolving 1000 parts of polyhexamethylene adipamide, having a melt viscosity of 52,000 poises at 285° C., in 3500 parts of 90% formic acid at 60° C., then adding 1167 parts of paraformaldehyde, 2000 parts of methanol and 1 part of potassium hydroxide. The mixture is heated at 60° C. with agitation for 0.5 hour, then cooled quickly by pouring into a mixture of 11,000 parts of cold acetone and 14,000 parts of ice and water. The desired polyamide, N-methoxymethyl polyhexamethylene adipamide, is precipitated by neutralization of the formic acid with ammonia. Twenty-eight and six-tenths parts of the polyamide, 15.4 parts of methyl (9) 10-phenylolstearate, 0.45 part of triethanolamine, 7.8 parts of water and 70.3 parts of ethanol are heated and stirred until the polyamide has dissolved. A second composition is prepared by dissolving 91 parts of the polyamide in 25 parts of water and 225.2 parts of ethanol. To this solution is added 29.4 parts of methyl (9) 10-phenylolstearate, 1.44 parts of triethanolamine, and a dispersion of 2.8 parts of carbon black in 19.6 parts of this same plasticizer.

An anchor coat is applied by spreading two coats of the first mentioned composition at 60–70° C. over 1.32–53" sateen fabric, each coat being followed by drying at approximately 60° C. At this point the coated fabric is passed through calender rolls, the hot roll at 160° C. in contact with the coating, the cold roll in contact with the fabric. Using the same procedure of drying between coats at 60° C., 40 coats of the second composition are applied at 60–70° C. bringing the coating weight to 9.9 oz./50" yard. The knife used to apply these coats is heated with steam to keep the solutions warm while being spread on the fabric. The resulting coated fabric is found to be extremely pliable, does not crack when folded sharply until the temperature of the coated fabric is reduced to −60° F., and withstands 70 million flexes in the Schiltknecht flex test at 77° F. without cracking of the coating.

The excellent properties of the coated fabric obtained by the procedure in the above example may be contrasted with a coated fabric similarly prepared with the exception that the plasticizer used in the example is replaced by N-ethyl ortho- and para-toluene sulfonamide as the plasticizer. The coated fabric made with the toluene sulfonamide cracks at +10° F. and does not show the outstanding flex-cracking resistance.

*Example VI*

Twenty parts of an interpolyamide prepared from hexamethylenediammonium adipate, hexamethylenediammonium sebacate, and caprolactam in the ratio 40:30:30 and having a melt viscosity of 9100 poises is dissolved with 16 parts of methyl (9) 10-phenylolstearate and 4 parts of dibutyl phthalate in 117 parts of a solvent comprising chloroform and methanol in the volume ratio of 2:1. The solution is cooled to room temperature and poured onto a glass plate. By means of a levelling blade the solution is spread to an even layer and the solvent allowed to evaporate at room temperature. This very pliable film has a tensile strength of 1560 lbs./sq. in. based on the original dimensions and elongates 400% of its original length prior to breaking in the tensile test. The film is dry and shows no exudation. It exhibits great durability in the Schiltknecht flex test, withstanding up to 23.6 million flexes before cracking failure.

A suitable method for preparing these hydroxyphenyl substituted long chain carboxylic esters which form the plasticizer of this invention comprises heating a mixture of the monohydric alcohol ester of the long chain unsaturated carboxylic acid with an excess of phenol employing as catalyst boron trifluoride or a complex of boron trifluoride with water or methanol as described in application Serial No. 444,150 filed May 22, 1942 by E. K. Ellingboe and F. C. McGrew. For example, methyl (9) 10-phenylolstearate is prepared by combining in a suitable container 666 parts of methyl oleate, 850 parts of phenol, and 18 parts of the compound containing boron trifluoride and water in a 1:2.7 molar ratio and heating the contents for 5 hours at 110° C. with agitation and excluding air with an inert gas such as nitrogen. The mixture is then allowed to cool to room temperature and 400–600 parts of benzene added to facilitate subsequent purification by washing. This is accomplished by washing with successive portions of 5% aqueous sodium bicarbonate solution until the washings are alkaline to litmus paper. Washing is then continued with water until wash water is neutral to litmus. It is generally desirable to add sodium chloride to break emulsions which may be encountered during the washing. The organic layer is then heated at 100° C. under a vacuum of 1–2 mm. to remove benzene, water, and a portion of the excess phenol. Subsequent to this treatment the residual phenol and methyl oleate are removed first by heating for 2 hours at 125° C. under a 2 mm. vacuum and then for 15 minutes at 210° C. under a 1 mm. vacuum. The residue, methyl (9) 10-phenylolstearate, is found to have an ester number of 138.3, an iodine number of 67.1, an acid number determined electrometrically of 9.3, and a refractive index at 25° C. of 1.4900.

The present compositions comprising a polyamide and a monohydric alcohol ester of a phenolated long chain carboxylic acid possess qualities of flexing endurance, low temperature durability and pliability which are greatly superior to those of prior polyamide-plasticizer compositions. By means of the plasticized polyamide compositions described herein it is possible for the first time to make available products possessing substantially all of the requirements needed for broad utilization of polyamide coated fabrics as leather substitutes and in particular as uppers for footwear.

Although a particular advantage of this invention resides in the fact that the improved plasticized polyamides described herein can be obtained with a single component plasticizer, it is within the scope of this invention to incorporate additionally when desired other types of plasticizers, such as dibutyl phthalate, tricresyl phosphate, monomeric amides boiling over 220° C., cycloketones in which a carbonyl group forms a part of the ring structure, other phenols, and sulfonamides, especially alkylarylsulfonamides, e. g., amylbenzene sulfonamide. The compositions of this invention may also contain other types of modifying agents, such as luster modifying agents, pigments, fillers, dyes, antioxidant, oils, antiseptics, resins, and cellulose derivatives.

The present compositions are used to advantage for the purposes to which the known plasticized polyamide compositions are applicable. Thus, fabrics coated with the compositions of this invention are especially useful in the fabrication of shoe uppers and upholstery where pliability and resistance to failure on repeated flexing are of prime importance. Other uses of the compositions of this invention are as impregnating agents or coating compositions for cloth, paper, metal, wood, and leather. Another application is in the impregnation or coating of cloth, followed by calendering or pressing for use as collar interliners. In preparing coated or impregnated fabrics of great strength, for example, it is desirable to apply the coating or impregnating solution to a fabric comprising fibers of a polyamide, such as polyhexamethylene adipamide.

The compositions of this invention can be used in film form as wrapping foils, leather applications, raincoats, shower curtains, umbrellas, films, ribbons, sheets, and safety glass interlayers. By reason of the fact that the polyamide composition of this invention may be melted and thus extruded, they can be formed into tubing or coated directly on fabrics or metals. In addition, when extruded as fibers, valuable applications are yarns, fabrics, bristles, surgical sutures, fishing leaders, fish lines, dental floss, and as fabric for wrapping electrical insulation for wires.

In addition, compositions of this invention are useful in the extrusion coating of wires for electrical insulation purposes. Compositions are also useful in the preparation of blown articles such as toys, hollow toiletware, etc. Furthermore, they may be compression molded, for example, blanked or stamped out into shaped articles.

As is the case with the unplasticized polyamides, rawhide may be treated advantageously with the present plasticized polyamides to yield opaque, full, leather-like products. Polyamides may also be used in conjunction with known tanning processes to obtain leather having an increased fullness and tightness.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a synthetic linear polyamide plasticized with

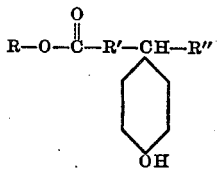

in which R is a monovalent aliphatic radical containing from 1 to 6 carbon atoms, R' is a divalent aliphatic radical, and R" is a monovalent aliphatic radical, and in which the aliphatic chain

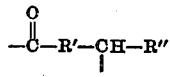

contains from 6 to 22 carbon atoms, said polyamide yielding on hydrolysis with hydrochloric acid, at least one substance of the group consisting of aminoacid hydrochloride, a mixture of diamine hydrochloride with dibasic carboxylic acid, and a mixture of amino alcohol hydrochloride with dibasic carboxylic acid.

2. A composition of matter comprising a synthetic linear polyamide plasticized with a monohydric alcohol ester of phenylolstearic acid, wherein the phenol group is substituted on one of the carbon atoms numbered 9 and 10 in the chain, said polyamide yielding on hydrolysis with hydrochloric acid, at least one substance of the group consisting of aminoacid hydrochloride, a mixture of diamine hydrochloride with dibasic carboxylic acid, and a mixture of amino alcohol hydrochloride with dibasic carboxylic acid.

3. A composition of matter comprising a synthetic linear polyamide plasticized with the methyl ester of phenylolstearic acid, wherein the phenol group is substituted on one of the carbon atoms numbered 9 and 10 in the chain, said polyamide yielding on hydrolysis with hydrochloric acid, at least one substance of the group consisting of aminoacid hydrochloride, a mixture of diamine hydrochloride with dibasic carboxylic acid, and a mixture of amino alcohol hydrochloride with dibasic carboxylic acid.

4. A composition of matter comprising a synthetic linear interpolyamide plasticized with the methyl ester of phenylolstearic acid, wherein the phenol group is substituted on one of the carbon atoms numbered 9 and 10 in the chain, said polyamide yielding on hydrolysis with hydrochloric acid, at least one substance of the group consisting of aminoacid hydrochloride, a mixture of diamine hydrochloride with dibasic carboxylic acid, and a mixture of amino alcohol hydrochloride with dibasic carboxylic acid.

5. A composition of matter comprising a synthetic linear polyamide plasticized with a monohydric alcohol ester of phenylolstearic acid wherein the phenol group is substituted on one of the carbon atoms numbered 9 and 10 in the chain, said polyamide being the interpolymerization product of 40 parts of hexamethylenediamine and adipic acid in equimolecular proportions, 30 parts of hexamethylenediamine and sebacic acid in equimolecular proportions, and 30 parts of caprolactam.

6. A compostion of matter comprising a synthetic linear polyamide plasticized with a monohydric alcohol ester of phenylolstearic acid wherein the phenol group is substituted on one of the carbon atoms numbered 9 and 10 in the chain, said polyamide being the alcohol-soluble reaction product of polyhexamethylene adipamide, methanol, and formaldehyde.

7. Artificial leather comprising a flexible fabric coated with the composition defined in claim 2.

8. Artificial leather comprising a flexible fabric coated with the composition defined in claim 3.

9. Artificial leather comprising a flexible fabric coated with the composition defined in claim 5.

FRANK C. McGREW.